United States Patent [19]

Sachs

[11] Patent Number: 4,574,301
[45] Date of Patent: Mar. 4, 1986

[54] SECAM COLOR IDENTIFYING CIRCUIT

[75] Inventor: Jean-Pierre Sachs, Paris, France

[73] Assignee: U.S. Philips Corporation, New York, N.Y.

[21] Appl. No.: 635,997

[22] Filed: Jul. 30, 1984

[30] Foreign Application Priority Data

Aug. 24, 1983 [FR] France .................... 83 13642

[51] Int. Cl.$^4$ .............. H04N 9/47; H04N 11/18; H04N 9/45; H04N 9/455
[52] U.S. Cl. ........................ 358/18; 358/14; 358/19
[58] Field of Search ............. 358/18, 14, 19, 24, 358/25; 358/11

[56] References Cited

U.S. PATENT DOCUMENTS

| 4,072,983 | 2/1978 | Aschwander | 358/19 |
| 4,240,102 | 12/1980 | Groeneweg | 358/11 |
| 4,357,623 | 11/1982 | Hinn | 358/18 |
| 4,408,222 | 10/1983 | Gay | 358/24 |

Primary Examiner—James J. Groody
Assistant Examiner—Michael P. Dunnam
Attorney, Agent, or Firm—Thomas A. Briody; William J. Streeter; Edward W. Goodman

[57] ABSTRACT

The invention relates to color television receivers.

Bursts which are transmitted during the line and field retrace-periods and whose frequencies change from one line to the other between 4.25 MHz (blue, luminance) and 4.40625 MHz (red-luminance) are used to obtain a color identification for each line.

To that end a frequency-shift discriminator in which the chrominance subcarrier is switched between two paths, one path being direct and the other comprising a phase shifting circuit, the two parts (9, 10) being thereafter switched to the two inputs of a multiplier (4) whose output signal thus comprises a frequency-dependent DC component. According to the invention, the phase shifting circuit included in one of the paths is constituted by the so-called "cloche" filter (2) which is usually used in all SECAM television sets and which thus fulfills in the circuit according to the invention a special function in addition to its customary functions (FIG. 1).

4 Claims, 4 Drawing Figures

SECAM COLOR IDENTIFYING CIRCUIT

The invention relates to a colour identifying circuit forming part of a colour decoding system of the SECAM type, the system comprising a so-called "cloche" pulse-shaping filter, said identifying circuit being mainly constituted by a phase comparator coupled to a phase shifting circuit, a so-called "colour identifying burst" signal being applied to one of the two inputs of said phase comparator whilst this same signal, after having been conveyed through said phase shifting circuit is applied to the other input.

Such a system is used in colour television receivers of the SECAM type.

The colour identifying circuit has for its function to recognize colour identifying bursts which are transmitted during the line retrace period, and the frequency of which differs depending on whether, during the following line, a chrominance subcarrier supplies a colour difference information "red less luminance" denoted $D'_R$ or "blue less luminance" denoted $D'_B$. The frequency of the burst is 4.406 MHz for a line $D'_R$ and 4.25 MHz for a line $D'_B$. This identifying circuit is consequently a frequency discriminator whose output signal is used as a logic signal by the logic circuits which check whether the colour signals are correctly received.

Since this identifying circuit is predominantly formed by a frequency discriminator it is obvious to use one of the numerous, known frequency discriminator circuits to realize it.

Thus, certain arrangements utilize a resonant circuit tuned to one of the two frequencies, which consequently produces a signal whose amplitude depends on the frequency. Such an assembly is described in "le nouveau guide de la télévision en couleur" (published by Chiron, Paris). Vol. 2, page 130.

However, because of the general use of integrated circuits a different type of frequency discriminator is generally preferred, constituted predominantly by a phase shifting circuit and a phase comparator or logic multiplier in which the product of the signal to be identified and this same signal after having been conveyed through the phase shifting circuit is produced. The circuit according to the invention utilizes this procedure, which is described in, for example, "le récepteur à modulation de fréquence" by J. Cerf (also published by Chiron), pages 125–127.

The phase shifting circuit must either be suitably tuned or provided to compensate for the inevitable tolerances in the components of which it is assembled. Its implementation is therefore critical.

According to the invention, an identifying circuit is therefore characterized in that the phase shifting circuit is constituted by the "cloche" pulse-shaping filter.

The inventive idea on which the invention is based is the use, to form said phase shifting circuit of the "cloche" filter already present in all existing colour decoding systems. As this circuit must in any case be adjusted, its phase characteristic, which is an important factor in the mode of operation of the circuit, is kept within narrow tolerances.

A high-pass filter is advantageously arranged in the path of the signal which has not flowed through the phase shifting circuit.

Advantageously, it comprises inter alia, arranged in series with the multiplier, at least a gate circuit whose control input is connected to a generator which produces a pulse in synchronism with the colour identifying burst.

In a specific embodiment, the circuit according to the invention is characterized in that the multiplying circuit is constituted by a differential pair connected to a first change-over switch, arranged in series with a second change-over switch, and finally connected to a subtracting circuit, said differential pair producing from the identifying burst two anti-phase currents to the first change-over switch which is controlled at half the line frequency, the second change-over switch being controlled by the phase shifted signal, and the subtracting circuit processing the difference between the two currents coming from the second change-over switch.

The circuit according to the invention is particularly advantageous as one phase shifting circuit becomes superfluous and the associated control operations are not necessary.

Using a "cloche" filter in a line identifying circuit is known per se from U.S. Pat. No. 4,072,983. But the circuit disclosed in said patent is of the tuned circuit type mentioned in the foregoing and not of the phase shifting-phase comparison type, and consequently requires the cloche filter to be switched to modify both the tuning frequency and the overvoltage coefficient. Consequently, this circuit requires additional components for switching purposes and for modifying the characteristics resulting from this switching operation, whereas, contrary thereto the circuit according to the invention makes it possible to omit elements compared with the prior art circuits, as the cloche filter is neither switched nor modified.

The following description given by way of nonlimitative example with reference to the accompanying drawings, will make it better understood how the invention can be put into effect.

Figure 1:
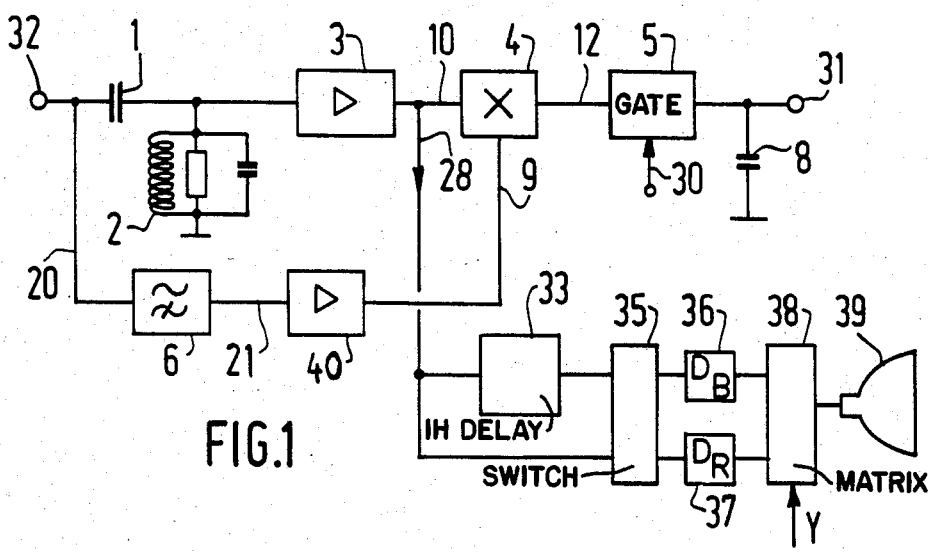
FIG. 1 is a block circuit diagram of the colour identifying circuit according to the invention.

The terminal 32 of FIG. 1 is connected to an arrangement (not shown) which supplies to this terminal in known manner a composite luminance signal, that is to say a signal comprising both luminance and chrominance information. This signal is transmitted via a capacitor 1 to a so-called "cloche" pulse-shaping filter shown at 2. This filter is necessary in all SECAM receivers to effect shaping of the signal in such a way as to compensate for signal distortion which was produced intentionally before transmission and known as an "anti-cloche" curve. In addition thereto, this cloche circuit has for its also known effect, that the signal portion relating to the luminance is eliminated.

The cloche circuit is connected to an automatic gain control amplifier 3 whose output is connected on the one hand to a phase comparator 4 and on the other hand via the line 28 to a known colour decoding device, which is schematically illustrated by a delay line 33, a changeover switch 35, demodulation and de-emphasis circuits 36, 37, a matrixing circuit 38 and a picture-screen tube 39.

The terminal 32 to which the composite luminance signal is applied is also connected to a second input of the phase comparator 4 via elements 20, 6, 21, 40, 9. In this circuit the "colour identifying burst" signal which forms part of the composite luminance signal is then applied to one of the inputs of the phase comparator 4 via the path 20, 21, 9, whilst this signal is also applied to a further input after having flowed through the phase-shifting circuit formed by the "cloche" pulse-shaping filter 2.

Figure 3:
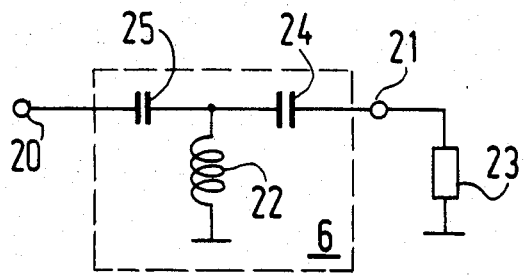
FIG. 3 shows a circuit diagram of the high-pass filter.

A high-pass filter 6 is incorporated in the path of the signal which does not flow through the cloche filter. This filter has for its object to eliminate the luminance portion of the composite signal applied to terminal 32. Its cut-off frequency is lower than the identifying burst frequency and consequently it does in practice not introduce a phase shift between the two red and blue burst frequencies. Such a filter is shown in greater detail in FIG. 3. It comprises a capacitor 25 arranged between the input 20 and a further capacitor 24, which is connected to the output 21. A self-inductance 22 connects the junction point between the capacitors to ground. The resistors 23 represents the input impedance of the amplifier 40 (FIG. 1), which is connected to the output of the filter. The following values give good results: C25=100 pF, C24=10 nF, L22=47 μH, R23=3.3 kOhm. This filter does not produce a phase shift of more than 1.5 degree, and a transmission difference less than 0.3 dB between the two blue and red burst frequencies. Its influence on the operation of the phase comparator is thus so little as to be disregarded.

The amplifier 40 of FIG. 1 has for its object to compensate for the insertion loss of the filter 6 and to bring the signal to the same level on the two inputs of the multiplier or phase comparator 4.

The circuit shown in FIG. 1 comprises inter alia, arranged in series with the phase comparator 4, a gate circuit 5 whose control input 30 is connected to a generator which produces a pulse in synchronism with the colour identifying burst. This gate has for its object to improve the signal-to-noise ratio of the circuit, and does not sample the signal until during the useful bursts. There is no use in describing its detailed circuit diagram, the various forms a sampling gate can have being well known to a person skilled in the art.

Figure 2:
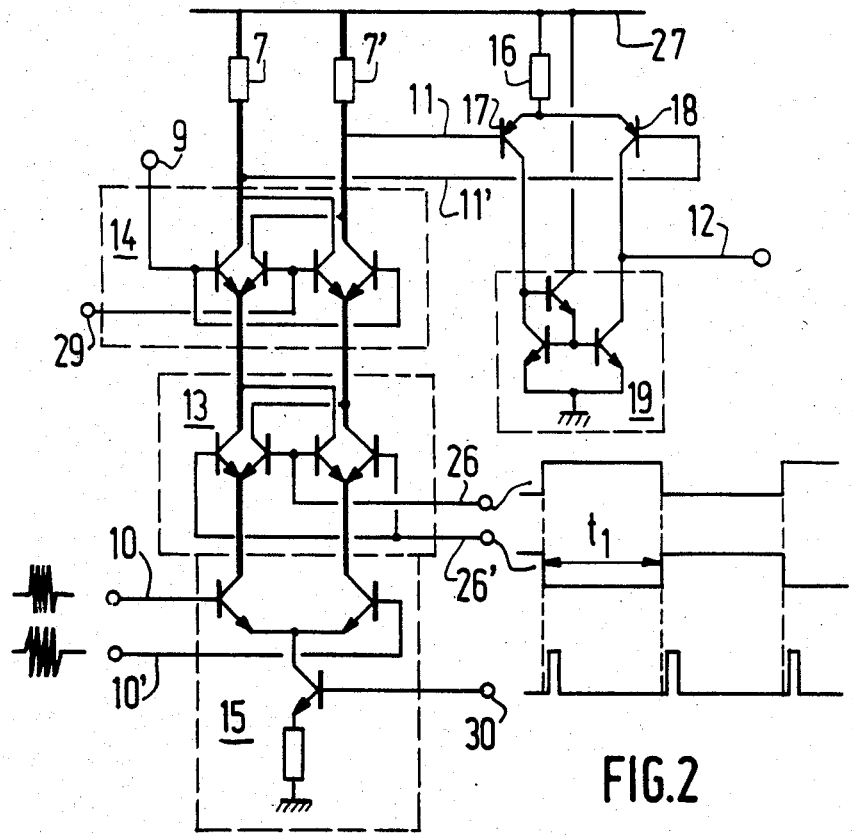
FIG. 2 is a detailed circuit diagram of a preferred embodiment of the multiplier.
Figure 4:
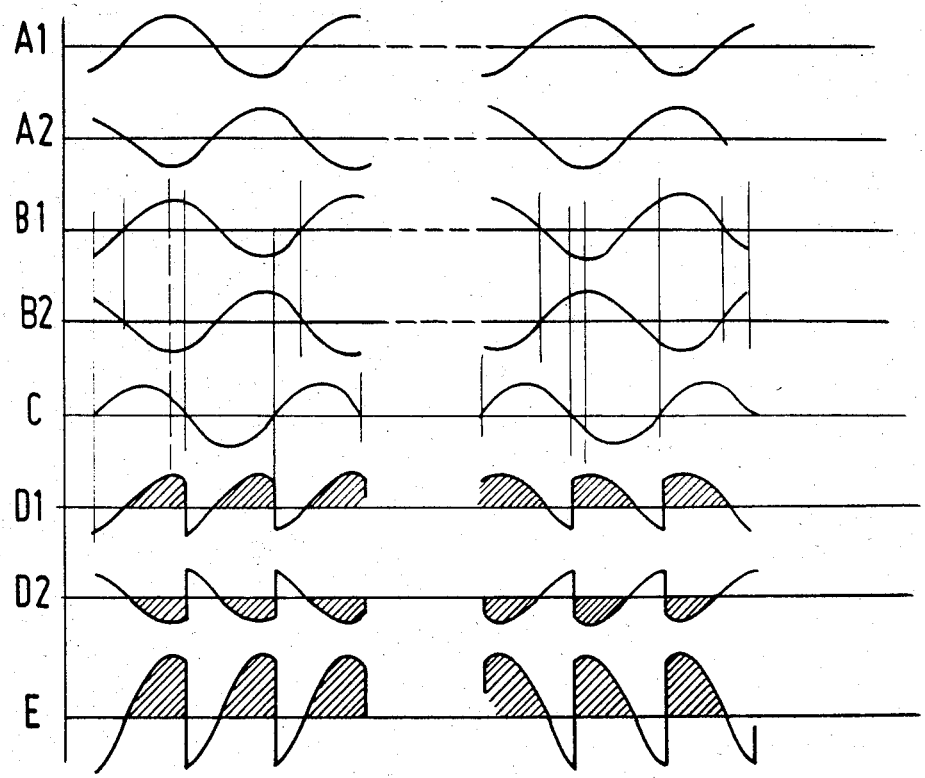
FIG. 4 illustrates the shape of some signals used in the assembly shown in FIG. 2.

The embodiment of the multiplier shown in FIG. 2 is particularly suitable for implementation in monolithic integrated circuit technique. It comprises a differential pair which is supplied by a current source constituted by a transistor having a resistor in its emitter path, this whole assembly being denoted by reference numeral 15. The burst signals originating from the amplifier 3 are applied to the bases of the transistors of the pair of transistors via the inputs 10, 10' (which correspond to the line 10 of FIG. 1). This amplifier which comprises symmetrical circuits supplies symmetrical signals, that is to say signals having opposite phases, to the terminals 10, 10'. A signal which has positive pulses whose duration corresponds to those of the identifying bursts is applied to the terminal 30 which is connected to the base of the current source supplying the differential pair 15. (This terminal 30 has been given the same reference numeral as the control terminal of the gate circuit 5 (FIG. 1) since the same signal is applied to it). Thus the differential pair applies, only during said bursts, two anti-phase currents to the first change-over switch 13 to which it is connected. These currents are designated by $A_1$ and $A_2$, respectively in FIG. 4. The indices 1 and 2 of FIG. 4 always relate to the respective left-hand and right-hand columns represented by solid lines in FIG. 2, of the assembly of the differential pairs and the change-over switches of the circuit. The first portion of the signal located at the left in FIG. 4 shows some alternations of the signal appearing at the beginning of a first line, and the second portion of the signal located at the right shows some alternations appearing at the beginning of the subsequent line. This holds for the whole FIG. 4.

The first change-over switch 13, which internal structure is well known to a person skilled in the art is controlled by two signals applied to the terminals 26, 26' at half the line frequency. Thus during one out of every two scanning lines the two currents produced by the differential pair are inverted ($B_1$, $B_2$, FIG. 4) before they are applied to the second change-over circuit 14, which is arranged in series with the first change-over switch 13. This change-over switch, which is constructed in the same known manner, receives a d.c. reference voltage at its control terminal 29, and at its terminal 9 the burst signal coming from the other branch via the high-pass filter 6 and the amplifier 40. Thanks to the presence of the cloche filter in one of the paths, the phase of this signal is shifted substantially through 90° relative to the signal in the other path applied to the terminals 10, 10' when the frequency is the central frequency of the cloche filter. In contrast therewith, the colour bursts being at adjacent frequencies on either side of the centre frequency of the cloche filter, the phase shift will be less than 90° for one line (approximately 50°) and somewhat more than 90° for the subsequent line (approximately 105°). This is symbolically shown by C in FIG. 4, where the indicated thick dots would coincide pair-wise if the frequency were the centre frequency. The voltage represented in C being applied in the change-over switch 14, the currents originating from the latter will have the shapes shown in $D_1$, $D_2$; they change their signs abruptly when the signal C passes through zero.

Finally, the second change-over switch is connected to a subtracting circuit via the leads 11, 11'.

This circuit is constituted by a differential pair 17, 18 which is fed via a simple resistor 16.

Resistors 7, 7' arranged in the conductors leading from the change-over switch 14 convert the currents ($D_1$, $D_2$ FIG. 4) of the latter into voltages which are applied to the bases of the transistors 17, 18. A current mirror 19 of known construction, which sends an equal current to the transistor 18, is provided in the collector of transistor 17. If the transistors 17 and 18 have the same base voltages and consequently the same collector currents, the circuit is balanced. If, on the contrary, the transistor 18 produces a current different from the current of transistor 17 which is applied to it by the current mirror, the difference between these two currents is conveyed to the lead 12. It consequently forms a subtracting circuit. Said difference is shown at E in FIG. 4.

It will not be difficult to understand that the phase shift on both sides of 90° produce DC components at the outputs of the change-over switch 14 owing to clipping of unequal peaks in the sinusoidal pulses, these components being alternately positive and negative from one line to the other. But since the conductors are inverted, also from one line to the other, by the change-over switch 13, the components have ultimately all the same sense. Then an average d.c. component appears at the output of the subtractor. This component is zero in the absence of colour bursts, and for example positive for a correct line identification and negative for a faulty line identification (in the opposite case). This component is utilized in known manner for correcting if necessary, the operation of the change-over switch 35 (FIG. 1) or to activate a circuit which is commonly denoted as the gating circuit in the event of black/white reception.

It will be obvious that variations are possible whilst remaining within the framework of the invention. It is, for example, possible to interchange the change-over switches in the series arrangement; it is alternatively possible to interchange the signals 9 and 10, the gate 5 may be provided elsewhere in the circuit and it is even possible to use a multiplier of a different nature.

What is claimed is:

1. A colour identifying circuit forming part of a colour decoding system of the SECAM type, the system comprising a so-called "cloche" pulse-shaping filter (2), said identifying circuit being mainly constituted by a phase comparator (4) coupled to a phase shifting circuit, a so-called "colour identifying burst" signal being applied to one of the two inputs of said phase comparator whilst this signal, after having been conveyed through said phase shifting circuit is applied to the other input, characterized in that the phase shifting circuit is constituted by the cloche pulse-shaping filter (2).

2. A circuit as claimed in claim 1, characterized in that a high-pass filter (6) is provided in the path of the signal which is not applied to the cloche filter.

3. A circuit as claimed in claim 1, characterized in that it comprises in series with the phase comparator at least a gate circuit (5) whose control input is connected to a generator supplying a pulse in synchronism with the colour identifying burst.

4. A circuit as claimed in claim 1 characterized in that the phase comparator is constituted by a differential pair of transistors (15) connected in series to a first change-over switch (13), a second change-over switch (14), and a subtracting circuit (16-19), said differential pair of transistors applying, from the identifying burst, two anti-phase currents to the change-over switches, one of the change-over switches being controlled at half the line frequency, the other change-over switch being controlled by the phase-shifted signal, and the subtracting circuit processing the difference between the two currents coming from the change-over switches.

* * * * *